United States Patent
Clark et al.

(10) Patent No.: US 6,300,950 B1
(45) Date of Patent: *Oct. 9, 2001

(54) PRESENTATION OF HELP INFORMATION VIA A COMPUTER SYSTEM USER INTERFACE IN RESPONSE TO USER INTERACTION

(75) Inventors: David J Clark, Warwick; Adam Alexander Dobson, Essex; Simon Peter Goodchild, Channel Islands; Andrew John Smith; Raymond Trainer, both of Warwick, all of (GB)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,025

(22) Filed: Apr. 2, 1998

(30) Foreign Application Priority Data

Sep. 3, 1997 (GB) ................................................ 9718582

(51) Int. Cl.$^7$ ...................................................... G06F 3/00
(52) U.S. Cl. ........................ 345/336; 345/333; 345/339; 345/342
(58) Field of Search .................................. 345/341, 342, 345/336–337, 333, 334, 339, 338

(56) References Cited

U.S. PATENT DOCUMENTS

| | | | |
|---|---|---|---|
| 4,648,062 | * | 3/1987 | Johnson ............................... 345/336 |
| 5,483,632 | * | 1/1996 | Kuwamoto ........................... 345/338 |
| 5,500,938 | | 3/1996 | Cahill et al. ......................... 395/161 |
| 5,539,869 | * | 7/1996 | Spoto et al. ......................... 345/336 |
| 5,546,521 | * | 8/1996 | Martinez .............................. 345/119 |
| 5,598,522 | | 1/1997 | Inatomi ................................ 395/352 |
| 5,602,982 | * | 2/1997 | Judd et al. ........................... 525/474 |
| 5,625,809 | * | 4/1997 | Dystart et a l. ...................... 345/340 |
| 5,689,666 | * | 11/1997 | Berquist et al. ..................... 345/342 |
| 5,760,788 | * | 6/1998 | Chainini et al. ..................... 345/348 |
| 5,801,701 | * | 9/1998 | Koppolu et al. ..................... 345/352 |
| 5,859,638 | * | 1/1999 | Coleman ............................. 345/341 |
| 5,923,325 | * | 7/1999 | Barber ................................. 345/336 |
| 5,999,179 | * | 12/1999 | Kekic et al. ......................... 345/349 |
| 6,016,145 | * | 1/2000 | Horitz et al. ........................ 345/342 |
| 6,026,417 | * | 2/2000 | Ross et al. ........................... 707/517 |
| 6,037,937 | * | 3/2000 | Beaton et al. ....................... 345/339 |
| 6,049,334 | * | 4/2000 | Bates et al. .......................... 345/332 |

FOREIGN PATENT DOCUMENTS

0717343A1    6/1996   (EP) .

* cited by examiner

*Primary Examiner*—Raymond J. Bayerl
*Assistant Examiner*—Thomas J Joseph
(74) *Attorney, Agent, or Firm*—Scully, Scott, Murphy & Presser; Casey P. August

(57) ABSTRACT

Provided is a framework supporting presentation of help information via a computer system user interface in response to the proximity of an input device pointer to an interface area associated with a user interface component. The framework provides generic methods which remove from user interface components much of the task of managing the presentation of help information. The framework supports presentation of help information for a platform-independent component programming environment and supports presentations in a plurality of different styles (such as text, audio, animating graphics, etc) by means of selectable presentation methods.

3 Claims, 2 Drawing Sheets

PRESENTATION OF HELP INFORMATION VIA A COMPUTER SYSTEM USER INTERFACE IN RESPONSE TO USER INTERACTION

FIELD OF THE INVENTION

The present invention relates to the presentation of information via a computer system user interface in response to user interaction via an input device.

BACKGROUND OF THE INVENTION

A common requirement for a computer system user interface (UI) is the capability to display some information to the user when a user input device controlled pointer (e.g. mouse pointer) passes over some part of the interface, approaches part of the interface, or lingers over part of the interface. Such information can offer additional explanation of that part of the interface, and of the consequences of the user interacting with it, and can be particularly useful when the interface itself omits some of that information in order to reduce the screen area it uses.

For example, many UIs incorporate push buttons which display small icon graphics representing the task they perform. Such buttons can be gathered into rows or columns, sometimes called "tool bars", and the area of screen which they occupy is very much less than would be required if each push button carried a full textual description of its function. However, the small icon graphic may not always be clearly understood, especially by a new user of the interface, so a textual explanation for each button, shown if the mouse lingers over that button, can greatly enhance the ease of use of the interface.

The information can be presented in many different ways. Some examples include pop-up boxes or bubbles containing text, via which text overlays the existing interface with suitable graphics to delineate it from its surroundings and perhaps to reinforce which part of the interface it relates to. Alternatively, the text can be shown on a status bar, or in a message window, or it could be spoken via a suitable audio interface. Sometimes, the information may not take the form of simple text presentation, but some other alteration applied to the interface, such as changing an outline colour, animating a graphic, initiating a sound effect, and there are of course many other possibilities.

In an interface even of only moderate complexity, there may be many different parts to which such information can be applied, and managing this collection of pieces of information can present a significant challenge even to one skilled in the art. This problem increases for interfaces which change dynamically, especially if parts of the interface are to be added and managed by program code over which an interface designer has no direct control. For example, it is known in the art for certain applications to operate as containers into which a variety of components (applets or UI controls) can be inserted, with different components possibly being created at different times by different people. Additions to the interface due to the insertion of such components by a system end user or interface designer are not readily under the specific control of the developer of the container.

In a platform-independent component programming environment, such as Java (trademark of Sun Microsystems Inc.), no help information is generally presented for application components unless the individual components themselves include methods for this presentation, since there is currently no applicable generic mechanism for presenting help information. This is a distinction from less dynamic environments where applications written for a particular operating system are often coded to make calls to standard operating system functions to present 'help' information. Such standard operating system functions do not typically provide mechanisms for handling help presentation for dynamically changing interfaces.

Although it avoids reliance on specific operating system functions, requiring components to be fully responsible for presenting their help information significantly increases the effort of component development. In particular, defining a state model for a sensitive screen area (to determine what pointer movements should trigger presentation of help information, when the help information should be removed, etc) is a complex and time-consuming task.

Also, from the end user's perspective, if each component is responsible for presentation of help information then interfaces will often have inconsistent information presentation for similar interactions with different components (for example, different styles of help bubble may appear). This may be very confusing for the user. Furthermore, the information presentation functions which are provided by an operating system or built into a component may not provide the type of information presentation effects that the user really wants (for example, if the user wants audio help information but only text-based "hover help" is supported).

A further difficulty arises due to the demands users make upon the display of information as described above. In order that the information is presented in a timely fashion to those users who require it, but does not impede the activities of those users who do not require it, a more sophisticated behaviour must be provided than a simple implementation might achieve. This is especially true because a user who does not require assistance at one time may require that same assistance at another time, or when using an unfamiliar part of the interface at the same time. If the behaviour the user requires and expects is not provided, the user may become irritated and frustrated, and the ease of use of the interface may be reduced rather than increased.

SUMMARY OF THE INVENTION

The present invention provides a generic mechanism for presentation of help information via a computer system user interface (UI) in response to user interaction with UI entities with which the information is associated. The generic presentation mechanism removes from UI components much of the task of managing the presentation of help information and supports presentation of information in a plurality of different styles (such as text, audio, animating graphics, etc). The invention is preferably implemented in a help information presentation manager framework for a platform-independent computer programming environment.

A UI 'entity' in this context is any software component having a representation within the user interface or otherwise having an area of the interace associated with it (hereafter a UI component), and any region of the user interface which is associated with a UI component. 'UI entities' thus include UI components such as application programs or applets represented by icons, UI controls such as buttons, scrollbars and entry fields, item lists such as toolbars and menu bars, windows, and also parts of diagrams and charts, and areas of image maps.

'Help' information in this context is information in the form of text, images, sound or any other media which informs the user about a part of an interface, or the consequences of interacting with it. Such information is not an essential internal feature of a UI component, and so it can be implemented separately from a UI component's state model or can be associated with a UI entity which does not have different operational states (such as a portion of a chart). That is, although the displaying of help information may be actuated by an interaction event which also changes the state of a UI component, the action of displaying the help information may be triggered independently of a UI component's state transition engine.

The invention is particularly suitable for the presentation of 'first-level help'. First-level help comprises a single level (i.e. non-hierarchical arrangement) of items of help information which are associated with and accessible from defined areas of a user interface. The invention considerably extends the capability of prior art first-level help functions.

In a first aspect, the present invention provides a presentation manager framework for supporting presentation of help information for UI entities via a computer system user interface, the presentation manager framework including:
  a UI entity definition component, for encapsulating interface area definitions and associated help information for UI entities; and
  a presentation interface providing a set of one or more generic help information presentation methods for implementation by a plurality of presentation components each in accordance with a respective presentation style.

A presentation manager implementing the framework preferably includes a plurality of selectable presentation components each implementing the presentation interface for presentation of help information according to a different one of a plurality of predefined presentation styles. The presentation manager preferably also includes:
  means for selecting one of said presentation components according to a desired presentation style for presentation of information for one of said UI entities;
  means for actuating the selected presentation component in response to user interaction with said UI entity.

In a second aspect, the invention provides a presentation manager for handling presentation of help information for a plurality of UI entities via a computer system UI, the presentation manager including:
  a plurality of presentation components each for presentation of help information according to a different one of a plurality of predefined presentation styles;
  means for selecting one of said presentation components for presentation of information associated with one of said UI entities;
  means for actuating said selected presentation component in response to user interaction with said UI entity.

A presentation manager according to the invention preferably provides presentation components for a plurality of the following "presentation styles":
  displaying text within a pop-up bubble (the "information" in this case is the text);
  displaying text on a message line or status line (the "information" is the text);
  playing of audio clips (where the "information" is the audio); and
  animating of graphics (where the "information" is the effect achieved by the animation and data operated on by a presentation method includes a set of images and animation properties such as the time between each image change).

Additional presentation styles may also be supported, such as a range of different help bubble styles (a prominent speech bubble appearance and a less prominent rectangle appearance, etc).

Prior art solutions for presenting first-level help do not currently provide a presentation manager with a generic mechanism for presenting UI entity-related information in a plurality of different ways, using a set of selectable presentation components. This flexibility of the generic mechanism to handle different presentation components is an important novel aspect of help information presentation according to the invention.

The presentation manager according to a preferred embodiment includes one or more selectable presentation components, each implementing methods for information presentation, and one or more UI entity definition components. Instances of the UI entity definition components encapsulate an interface area definition for a UI entity and information associated with that area which is to be presented via the computer system UI. This information may be an image, colours, sound, help text, etc. The one or more UI entity definition components are adapted to receive notification of relevant user interactions, such as movement of a pointing device into a specific area of the UI or hovering of a pointer over the area for a time, and then to issue notifications to a presentation component when they determine that the information they hold should be presented or removed.

Once a UI entity definition component has been created for a UI entity, the presentation manager is able to handle presentation of help information for that UI entity without further intervention from the relevant UI component other than notifying the presentation manager of relevant mouse movement events.

Each UI entity definition component may be associated with one or more presentation components, any one of which may be selected to handle the presentation. The selected presentation component receives notification when information is to be presented or removed, and takes appropriate action.

The selection of a presentation component according to the invention preferably includes support for user selection of which of a set of possible presentation components is to be used. This allows the user to customize the user interface to use their favoured help presentation styles, and enables avoidance of the problem of inconsistency which occurs where downloaded UI components each use their own custom-written method for presentation of their help information.

The present invention according to a third aspect provides a method of help information presentation via a computer system user interface for a plurality of UI entities, the method being implemented by a presentation manager including a plurality of selectable presentation components each for presentation of help information according to a different one of a plurality of predefined presentation styles, the method including the steps of:
  creating, in response to a UI entity being added to a UI, an instance of a UI entity definition component encapsulating help information and a UI area definition provided by said UI entity;
  selecting a presentation component of said presentation manager for presentation of said help information according to one of said presentation styles; and
  actuating said selected presentation component to present said help information in response to a user interaction wherein a user input device pointer is moved into a predefined proximity relationship with said UI area.

The selected presentation component is preferably actuated as follows. A first notification is sent to the UI entity definition component for the UI entity when the predefined pointer proximity relationship is achieved. The UI entity definition component then sends a notification to actuate the selected presentation component.

In a fourth aspect, the present invention provides a platform-independent presentation manager framework for supporting presentation of help information for a plurality of UI entities via a computer system UI, the presentation manager framework including:

- a UI entity definition class, for encapsulating UI area definitions and associated help information for each of a plurality of UI entities; and
- a presentation interface providing one or more generic presentation methods for implementation within one or more presentation classes adapted to be invoked by instances of the UI entity definition class to present help information.

Prior art solutions for the presentation of help information do not provide a mechanism which is adapted for a platform-independent programming environment such as for presenting help information on behalf of UI components written in the Java programming language.

The generic presentation methods of the presentation interface are highly generalised such that there is great flexibility in defining a presentation class which implements the presentation interface. Thus, different help information presentation styles such as text displays or sound clips may be implemented using the framework.

A presentation manager framework and method according to the present invention may be implemented within a computer program product comprising computer readable program code stored on a computer readable recording medium.

BRIEF DESCRIPTION OF DRAWINGS

A preferred embodiment of the present invention will now be described in more detail, by way of example, with reference to the accompanying drawings in which.

DETAILED DESCRIPTION OF PREFERRED EMBODIMENT

The present invention according to a preferred embodiment is implemented as presentation manager software for controlling the operation of a computer system on which the software is run.

Figure 1:
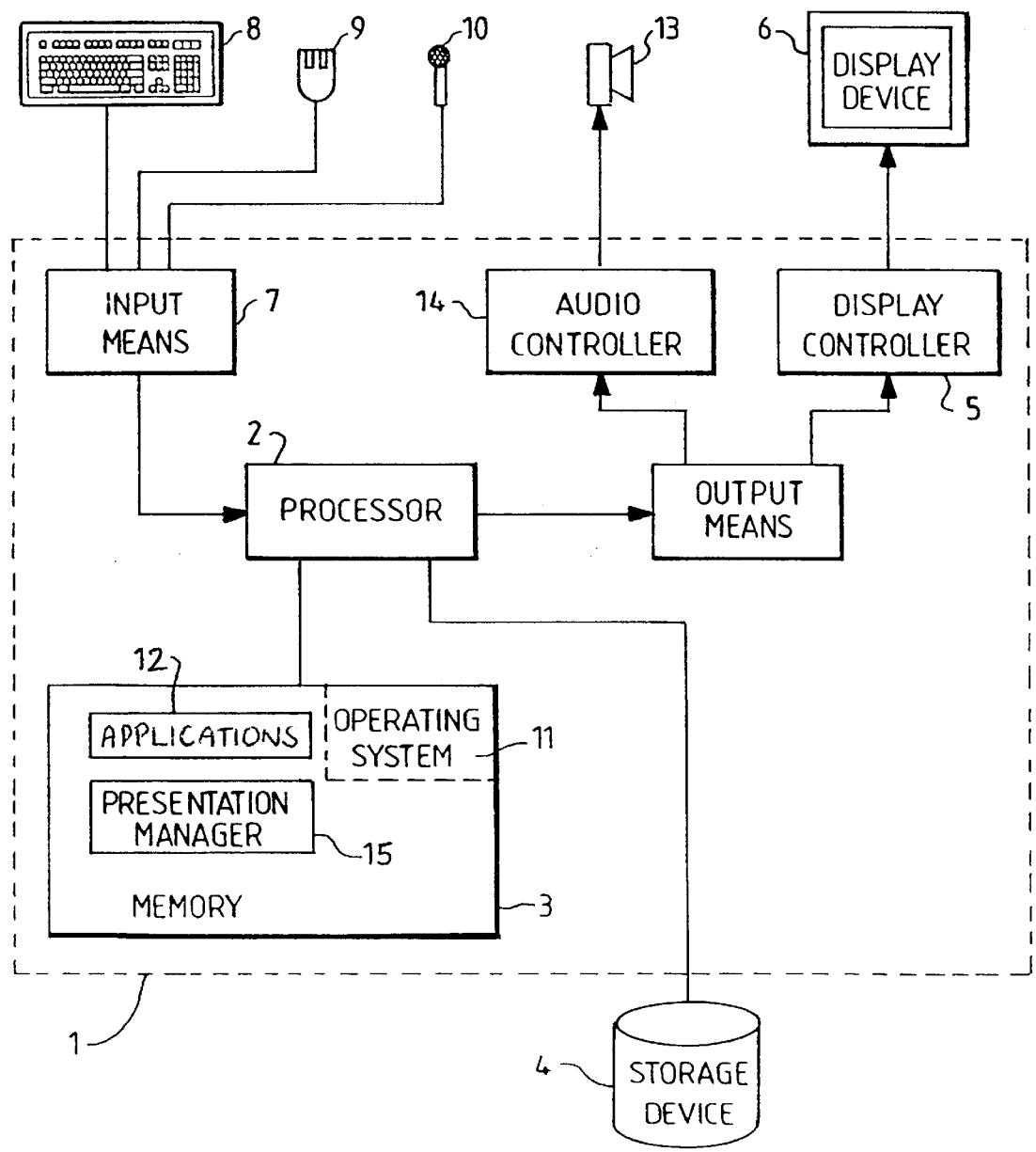
FIG. 1 is a schematic representation of a computer system in which the present invention may be implemented.

FIG. 1 shows the main functional elements of a typical computer system in which the present invention is implementable. The computer system 1 includes a central processing unit 2, memory 3, a storage device 4 which may be incorporated as part of the system or accessed remotely, an input means 7 for receiving user input from a keyboard 8, a mouse 9 or a microphone 10, a display controller 5 for transferring data received from the processor 2 to a connected display device 6, and an audio output controller 14 for passing audio signals from the processor to one or more speakers 13.

System memory 3 stores the operating system software 11, any application program 12 currently running on the system, and the presentation manager software 15 according to the invention. A GUI displayed on the display device 6 presents the user with visual representations of certain windows and icons including interface controls with which the user can work. Audio information may be played via the speakers 13.

The display controller 5 encompasses software and hardware elements used to pass data to the display device 6. In a computer system running IBM's OS/2 operating system, a layer of the operating system passes data to the display controller. In the preferred embodiment of the present invention, however, mapping to these underlying operating system presentation functions is not necessary.

The computer program code of the presentation manager according to the preferred embodiment is written in the Java programming language. As is known in the art, the standard Java class library includes a display update component within the java.awt.Component class, which is used for passing display data to a display controller. However, this known display update component does not currently include functions for the presentation of help information. Thus, UI components in the Java environment typically do not support the presentation of help information, and those UI components which do support presentation of help information must fully implement this support themselves.

The preferred embodiment of the present invention provides a generic presentation manager framework for the Java environment in which definitions of user interface areas sensitive to a user input device pointer can readily be associated with details of help information to be displayed, and associated with one or more suitable presentation components, and then presentation of first-level help information at appropriate times is managed automatically by the presentation manager framework and the presentation components on behalf of UI components and their associated interface areas.

Help information presentation according to the invention applies a design principle known in the art as "model-view separation", with the functions of defining and managing the data relating to sensitive interface areas and the information to be displayed being implemented separately from the functions which effect the presentation of the information.

Figure 2:
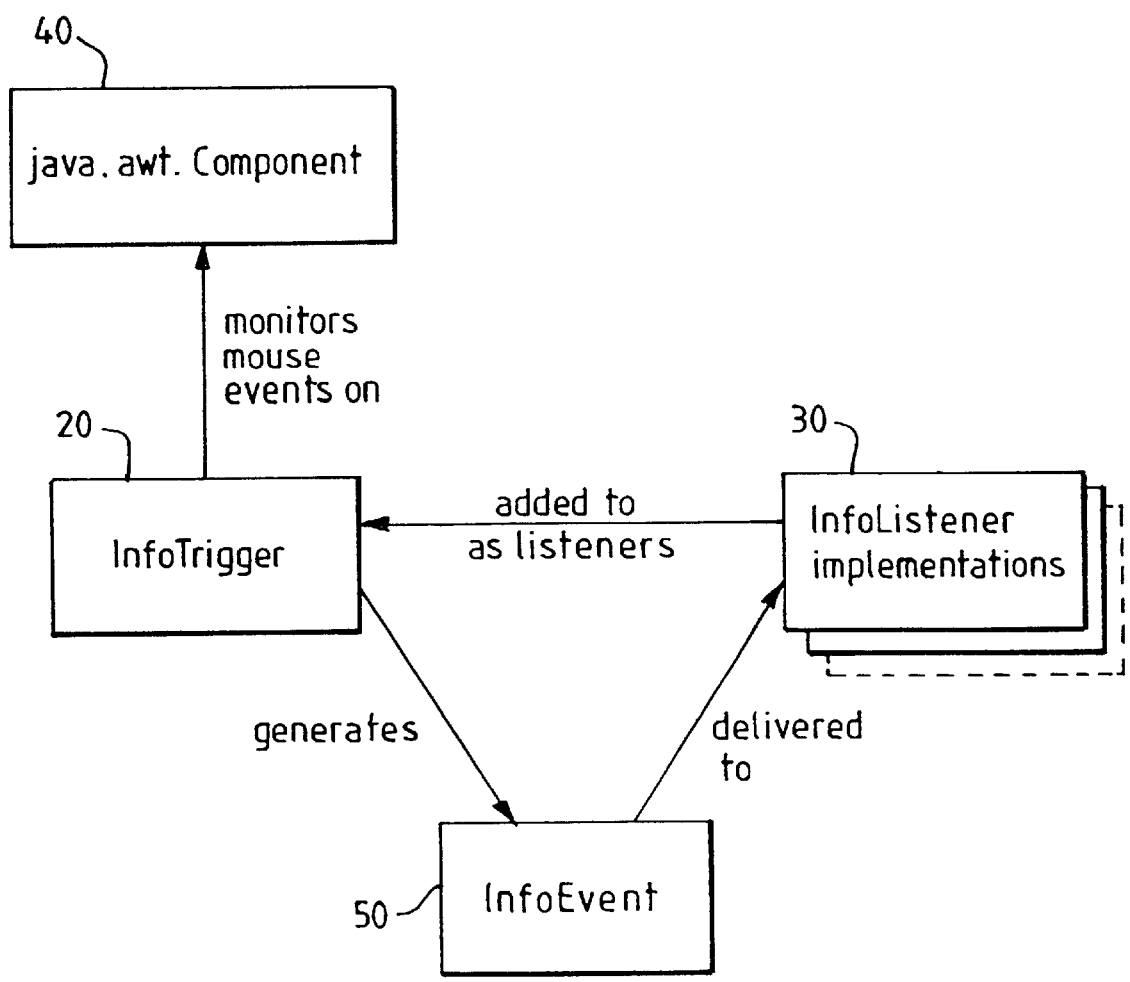
FIG. 2 is a representation of the class structure of a presentation manager framework according to an embodiment of the present invention.

The presentation of help information employs two main presentation management components as shown in FIG 2. The first of these is a generic UI entity definition component 20 comprising part of the presentation manager framework. Each instance of this UI entity definition component is specific to a particular UI entity, encapsulating details of a sensitive area of the interface and information to be associated with that area. This UI entity definition component receives notifications of relevant user interactions, such as pointing device motion, and it in turn issues notifications when it determines that the information it holds should be presented, changed, moved or removed.

The second of these components is a presentation component 30 adapted to implement an interface of the presentation manager framework which interface defines generic presentation methods. The presentation component encapsulates details of a particular method of information presentation which uses the generic methods. One or more of these presentation components can be associated with each UI entity definition component, as discussed below. A selected presentation component receives notifications when information is to be presented, changed, moved or removed, and takes appropriate action. Different presentation component implementations can take different actions to present the information in different ways.

There is at least one instance of the UI entity definition component for each distinct sensitive interface area and piece of presentation information. However, a single instance of a presentation component can serve many instances of the UI entity definition component, so that there may be relatively few instances of them required. Indeed, if all information is to be presented in a single manner (such as text displayed within a pop-up bubble) then a single instance may well suffice for all the UI entity definition components.

The design of the presentation manager framework, comprising a set of Java classes and defined interactions between the classes which provide the UI entity definition component 20 and the presentation interface implemented by presentation components 30, will now be described in detail.

InfoTrigger

This class 20 implements the UI entity definition component to encapsulate details of a sensitive area of the screen and the information to be associated with that area. These data are stored as a reference to a UI component 40 of the java.awt.Component class (which UI component may be a button, image map, list box, etc implementing the java.awt.Component class of the Java Abstract windowing Toolkit as a target for events and as a medium for presenting information to a display), an interface region on that UI component, and a text string (and/or other media) containing the information to be presented. The framework provides accessor methods to set and query these properties.

Further properties presented by this class include the interval in milliseconds for which the mouse pointer must linger (remain within the defined interface area) in order to trigger information presentation, and two integers identifying the information group (a group identifier) and a priority value. These values are used to determine what information is displayed when there are multiple overlapping defined interface areas. At most one set of information is presented in each group: if multiple instances of InfoTrigger sharing the same group identifier are triggered, only the information for the instance with the highest priority value is presented.

This class implements the known java.awt.event.MouseListener and java.awt.event.MouseMotionListener interfaces, and registers itself with UI components to receive notification of all relevant mouse interactions. It also allows classes which implement the InfoListener interface (see below) to be added as listeners to it, and it then issues the appropriate notifications to them.

The InfoTrigger class maintains a single static list of triggered InfoTrigger instances (see below). This list is initially empty. At any given time, exactly one InfoTrigger instance in the triggered list ought to have its help information displayed for each distinct group identifier for which there are InfoTrigger instances in the triggered list. This desired state is enforced by a static method on InfoTrigger, called manageDisplay() which makes a list of distinct group identifiers and calls a static method called manageDisplayFor() for each identifier found. The method manageDisplayFor() takes a group identifier as a parameter, and ensures that help information is displayed for exactly one of the triggered InfoTrigger instances for that particular group. The method manageDisplayFor() scans down the list of triggered InfoTrigger instances to identify instances having the group identifier, then compares their priorities and calls the kill() method (see below) on all instances except the one with highest priority. For the one with highest priority, it calls the show() method. As InfoTrigger instances are triggered or cease to be triggered, they are added to and removed from this triggered list. The InfoTrigger class ensures that these static methods are called at appropriate times to maintain the correct display. When a low priority instance is added to the list, the scanning of the list will simply confirm that the presently displayed instance should continue to be displayed.

To implement the appropriate behaviour and timings, the InfoTrigger class uses a background timer thread and a simple state model, with state transitions triggered by relevant mouse interactions and timer expiries. The internal state of an InfoTrigger instance can take one of the following values:

DEAD the information is not presented
READYTOWAIT the timer should be started as soon as possible
WAITING the timer is running
TRIGGERED the timer has expired, and this InfoTrigger instance is a candidate for display
SHOWING this InfoTrigger instance is displaying The methods which cause state changes are as follows:

startTimer()—this method is called each time a mouse movement occurs inside the sensitive area for the InfoTrigger instance, and its task is to start (or restart) the timer. If there is no InfoTrigger instance in the triggered list with the same group identifier as this InfoTrigger instance, it sets the current state to READYTOWAIT and notifies the timer thread. However, if there is such an InfoTrigger instance in the triggered list, triggers is called at once.

trigger()—this method is called by the timer thread, as shown below, when the timer expires, and can also be called by startTimer() if other InfoTrigger instances in the same group are already triggered, and its task is to make this InfoTrigger instance a candidate for display. It sets the current state to TRIGGERED and adds this InfoTrigger instance to the triggered list, and adds this InfoTrigger instance to the triggered list, and calls manageDisplayFor() passing it this InfoTrigger instance's group identifier.

kill()—this method is called each time a mouse movement occurs outside the sensitive area for the InfoTrigger instance, and each time the mouse moves out of the UI component's interface area altogether, and its task is to terminate presentation of the information. It removes this InfoTrigger instance from the triggered list, and calls hide().

show()—this method sets the state to SHOWING and calls showinfo() on all registered listeners to this InfoTrigger instance (see below).

hide()—this method sets the state to TRIGGERED if it has been called from SHOWING because a higher priority InfoTrigger instance has taken precedence, or sets it to DEAD if it has been called by the method kill(). It then calls hideinfo() on all registered listeners to this InfoTrigger (see below), and calls manageDisplayFor() passing it this InfoTrigger's group identifier.

Other methods include methods for adding and removing instances of classes implementing InfoListener and accessor methods for getting and setting property values.

The timer thread will wait for events to occur, and respond to those events according to the current state. There is also a mechanism which allows the thread to terminate if not needed, and restarts a thread when needed again. The action taken for each possible state is as follows:

DEAD timer thread not needed. Goes into an indefinite wait (or arranges to terminate).
READYTOWAIT timer is to be started. When the timer is started, the state is set to WAITING, and goes into a wait for a time interval determined by the timeout set for this InfoTrigger.

WAITING from this state, when the timer expires, triggers is called and the timer thread goes into an indefinite wait.

TRIGGERED timer not needed. Goes into an indefinite wait.

SHOWING timer not needed. Goes into an indefinite wait.

InfoListener

This interface defines methods which are to be called by an InfoTrigger instance when specific changes take place. Instances 30 of classes which implement InfoListener can be registered with an InfoTrigger instance by passing a reference to the addInfoListener() method on InfoTrigger, and deregistered by passing a reference to the removeInfoListener() method.

The methods defined by this interface, and the circumstances in which they will be called, are shown here. Each method receives as a parameter an instance of InfoEvent, described below.

showinfo()—this method is called when the InfoTrigger instance determines that the information is to be presented. The information presentation should be effected at once.

hideinfo()—this method is called when the InfoTrigger instance determines that the information is no longer to be presented. The information presentation should be removed at once.

changeinfo()—this method is called if display parameters, such as the contents of the text string and/or other media descriptor, change for the InfoTrigger instance while the information is presented. Updates to the display may need to be made.

moveinfo()—this method is called if the mouse pointer position changes while the information is presented. Some display styles may choose to move the information presentation with the mouse, in which case this is an opportunity to ensure that this is done.

InfoEvent

Instances of InfoEvent 50 are passed to the four methods shown above when specific changes take place for an InfoTrigger. The InfoEvent class extends java.awt.event.Event, and the event source will always be the InfoTrigger instance for which changes have occurred.

In addition, this class supports a getMousePosition() method, which returns the mouse pointer position when the change was triggered.

InfoPopup

The InfoPopup class represents one example presentation component implementation 30 of the InfoListener interface. InfoPopup thus includes specific methods implementing the abstract method definitions for showinfo(), hideinfo(), changeinfo() and moveinfo() which are part of the InfoListener interface described above.

The showinfo() method on InfoPopup calls a method which is specific to the InfoPopup class and which takes the current input device pointer position and opens a window displaying help text which is relevant to the pointer position. Properties on this presentation-class specific method include window size and shape, text font and colours such that the help presentation style implemented by InfoPopup displays a simple pop-up rectangular window, pale yellow in background, with black text word-wrapped to give convenient proportions, and with a thin black border around it. This is in appearance like many common implementations of pop-up or hover help which are known in the art.

This InfoPopUp class, and additional predefined presentation classes, may be packaged with the presentation manager framework of the invention. Furthermore, the InfoPopUp class is defined to be a default presentation component which is easily associated with instances of InfoTrigger. This provision of predefined presentation components and a simple mechanism for access to a default presentation component enables use of the presentation manager framework of the invention without any need to define customised presentation components unless specific custom presentation styles are wanted.

The default presentation component can be enabled for each instance of InfoTrigger by calling a method on InfoTrigger called enableDefaultDisplay() with true as the parameter, and disabled by calling the method with false as the parameter. This default style will be applied in addition to, and independently of, any instances of implementations of InfoListener which are explicitly registered as listeners to the InfoTrigger instance in question.

The sequence of operations for presentation of help information according to the invention will now be described.

An initialisation step prepares the presentation manager to handle information presentation on behalf of a UI component when that UI component is added to the user interface. In the preferred embodiment of the invention, the UI components are each responsible for providing to the presentation manager their help data and their associated interface area definitions, and a user or application assembler defines the association with a particular presentation component. Each UI component also includes a reference to a container object which applies this presentation component as a listener to the UI component.

In use, the presentation manager causes information to be presented when a mouse pointer or other user input device pointer remains for a certain preset time interval within an area of the interface which has been defined as a sensitive area. Each sensitive area has a group identifier. When the mouse pointer exits the sensitive area, the information is removed from the interface. However, if the mouse pointer exits one sensitive area by entering another which shares the same group identifier, the information for the new area appears at once, without the time delay which is often found in prior art help systems.

The preferred embodiment of the invention requires the application programmer to determine which presentation component of the presentation manager is to be used, and to provide appropriate presentation data for use by that presentation component. Each UI entity definition component instance is then created with a reference to the required presentation component.

An alternative embodiment of the invention supports user selection of a presentation component using a visual builder tool when a UI component is added to the interface, as follows. Firstly, an application developer must define appropriate presentation data for a plurality of different presentation components to use. The UI component provides its presentation data to the presentation manager and the visual builder tool then presents to the user a list of selectable presentation components. This list preferably comprises the set of presentation components for which presentation information was defined, but other heuristics may be applied in generating the list (such as listing presentation components in accordance with a predefined association between presentation component types and UI entity types).

Provision of such a facility for an application assembler or end user to select a preferred presentation component to implement a desired presentation style enables creation of an interface which is consistent and enables customisation to implement the presentation styles that the user really wants.

As noted above in the description of the InfoTrigger class, a mechanism is included for allowing sensitive areas to overlap, and to have different priorities. At most one sensitive area with a given group identifier displays its information at a time, thus avoiding potentially confusing multiple information displays. The priorities are not based on the z-value which identifies the order of previous activations of a series of windows, but on preset priority values (which may be UI entity-type-dependent).

In the preferred embodiment of the invention described above, UI components take actions to register themselves with the presentation manager framework. In a further alternative embodiment, the presentation manager initiates the registration process. The presentation manager will be invoked when a UI component is added to the user interface, and performs operations such as reserving screen area for the new UI component and changing the rules for event routing. Having been invoked when a UI component is added, the presentation manager is adapted to also issue a request to the new UI component for it to return data defining its presentation information and associated user interface area definitions. UI components adapted to use the present invention implement a method which returns to the presentation manager a list of presentation information items (help text, sound clips, animation sequences of images, etc) and definitions of the interface areas which are to be associated with each piece of presentation information. For each UI component, the presentation manager then creates a new instance of a generic UI entity definition component which encapsulates these information items and area definitions.

What is claimed is:

1. A presentation manager framework for supporting presentation of help information for user interface (UI) entities via a computer system user interface in response to a user interaction with a UI entity, the presentation manager framework including:

a UI entity definition component comprising an object class, instantiable for encapsulating interface area definitions and associated help information for each of a plurality of UI entities, instances of said object class being adapted to receive notifications in response to a user moving an input device pointer into areas of the computer system user interface respectively corresponding to interface area definitions of said plurality of UI entities and, in response to said receipt, to send notifications to a selected one of a plurality presentation components each implementing a presentation interface thereby to actuate said selected presentation component for performing presentation of help information for each of said plurality of UI entities independently of state transitions of said plurality of UI entities; and said presentation interface providing a set of one or more generic help information presentation methods for implementation by said plurality of presentation components each in accordance with a respective presentation style, wherein instances of said object class each having a group identifier and a priority value, and said framework including means for ensuring that at any one time help information is presented for only a highest priority instance of a plurality of notified instances having the same group identifier.

2. A presentation manager implementing a framework according to claim 1, including a plurality of selectable presentation components each implementing the presentation interface for presentation of help information according to a different one of a plurality of predefined presentation styles.

3. A presentation manager according to claim 2, including:

means for selecting one of said presentation components according to a desired presentation style for presentation of information for one of said UI entities;

means for actuating the selected presentation component in response to user interaction with said UI entity.

* * * * *

UNITED STATES PATENT AND TRADEMARK OFFICE
CERTIFICATE OF CORRECTION

PATENT NO. : 6,300,950 B1
DATED : October 9, 2001
INVENTOR(S) : David J. Clark et al.

It is certified that error appears in the above-identified patent and that said Letters Patent is hereby corrected as shown below:

Title page,
Item [30], Foreign Application Priority Data, "9718582" should read -- 9718582.1 --
Item [56], References Cited, U.S. PATENT DOCUMENTS, "5,625,809" reference "eta l." should read -- et al. --

Column 6,
Line 42, after "components" insert -- , --

Column 8,
Line 45, "showinfo" should read -- showInfo --

Column 9,
Lines 1 and 2, "triggers" should read -- trigger ( ) --
Line 22, "showinfo" should read -- showInfo --
Line 25, "hideinfo" should read -- hideInfo --
Line 29, "changeinfo" should read -- changeInfo --

Signed and Sealed this

Twenty-second Day of June, 2004

JON W. DUDAS
*Acting Director of the United States Patent and Trademark Office*